June 29, 1965  D. W. HAMM  3,191,948
PISTON RING

Filed May 14, 1962  2 Sheets-Sheet 1

INVENTOR.
DOUGLAS W. HAMM
BY
ATTORNEYS

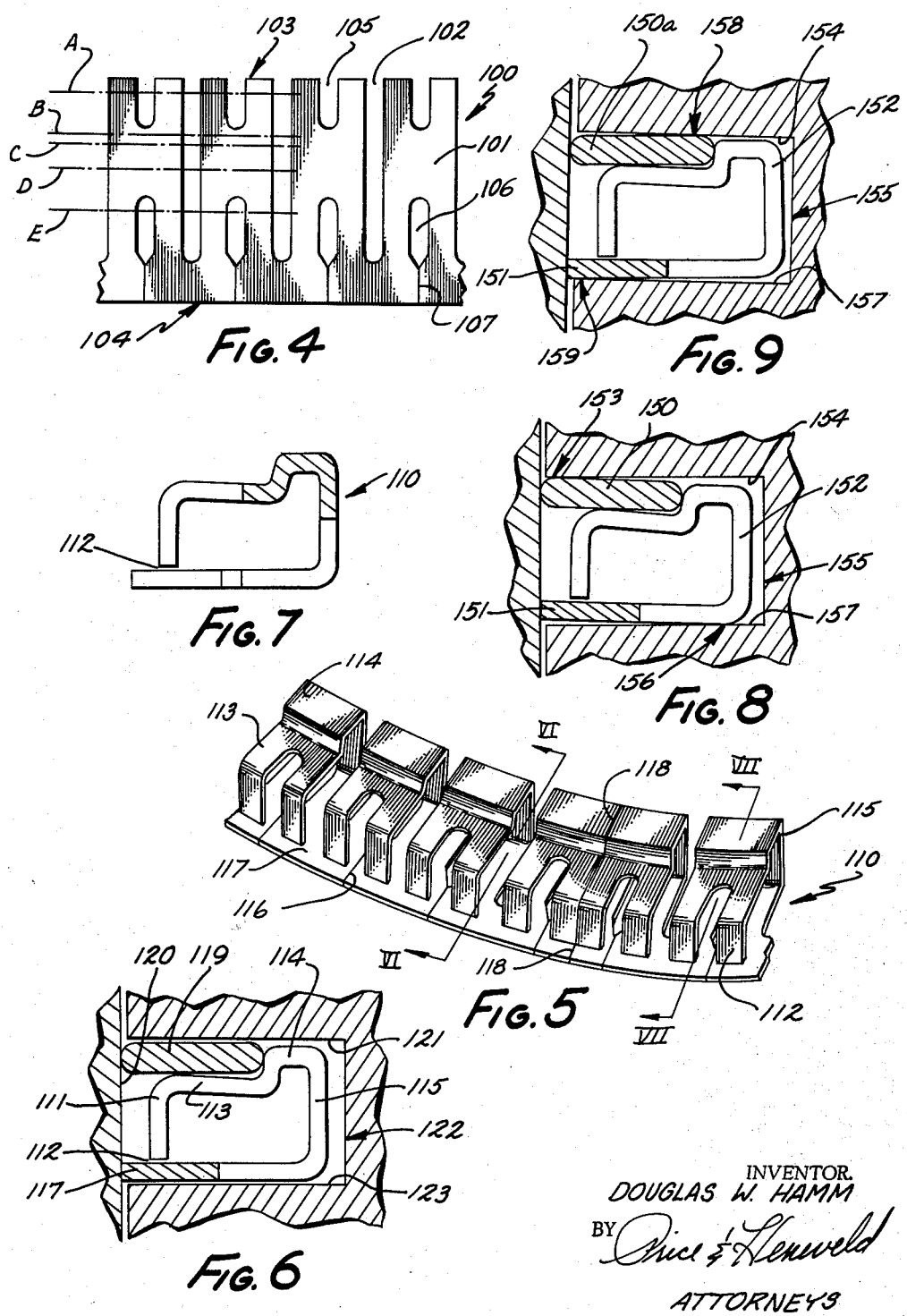

United States Patent Office 3,191,948
Patented June 29, 1965

3,191,948
PISTON RING
Douglas W. Hamm, Muskegon, Mich., assignor to Muskegon Piston Ring Company, Muskegon, Mich., a corporation of Michigan
Filed May 14, 1962, Ser. No. 194,597
5 Claims. (Cl. 277—139)

This invention relates to a piston ring having two components making sealing contact with the cylinder wall. These members are spaced axially. One of them is a conventional parted rail or steel segment and the other is an integral part of the spacer-expander component of the ring.

In the design of piston rings, and more particularly of oil rings, it is particularly desirable that the ring be characterized by conformability and flexibility. It has long been known that piston rings consisting of a large number of integrally joined segments, each of which has a limited degree of freedom for radial movement with respect to adjacent segments, provides the ultimate in flexibility in piston rings. Many such rings have been developed in the past. These rings, however, because of their segmental nature, have the disadvantage of incorporating a large number of tiny gaps or partings which collectively permit significant leakage past the ring. For this reason, piston rings employing parted rails or steel segments have been favored even though they lack the conformability and flexibility of the other type.

Piston rings equipped with two parted rails are less flexible because the rail is an annulus normally having significantly greater radial depth than axial thickness. Thus, its inherent strength and continuity prevent its adjustment to the smaller inconsistencies of the cylinder wall. Further, because the rails must act as a single body, they have little segmental response and there is a significant time lag in their response. The same is true with regard to effecting side sealing against the sides of the ring groove. It is seen from these remarks that each type of cylinder wall sealing structure has certain desirable functional characteristics and certain functional disadvantages.

This invention provides a combination of a segmented cylinder wall engaging land and a rail, thus combining the desirable qualities of both of these structures. It utilizes the capabilities of one structure to offset the shortcomings of other. The ring provides a rail seat at its upper side for mounting a conventional, parted rail which effects a seal against the cylinder wall characterized by a single parting. Preferably, this is placed at the upper side of the ring which is subjected to the greater pressures during operation since it is on the side adjacent the combustion chamber. Even in bi-rail type conventional rings, the top rail does the greater proportion of the significant sealing. The bottom or lower portion of this ring consists of a plurality of segments which seat against the lower side of the ring groove and also seat radially outwardly against the cylinder wall. These segments are an integral part of an interconnected by the body of the spacer which is designed to provide a springing action, furnishing unit pressure on each segment. Thus the lower land of the ring, because of its flexibility, is capable of conforming closely with the cylinder wall and of acting as an efficient scraper for lubricant attempting to enter the combustion chamber by passing upwardly between the piston and the cylinder wall.

This invention has other advantages. It is less costly than conventional rings utilizing two steel segments or rails. By reason of the elimination of one of the heavier rails and substituting for it a thinner, lighter land, the weight of the ring assembly is reduced. This reduces the inertia and momentum which cause deflection and thus seal impairment at each end of the operating stroke. Further, the design of this ring provides the land with inherent tension eliminating the necessity for a backing spring to reinforce the tension of the ring. This again reduces weight and cost.

The ring has the advantage of functionally and structurally divorcing that portion of the ring which provides support for the rail from the portion of the ring which develops tension. Thus, the ring may be designed to accommodate rails of a wide variety of radial wall depth while at the same time maintaining sufficient radial depth in the ring to assure proper tension and satisfactory installation.

These and other objects and purposes of this invention will be immediately understood by those acquainted wtih the design and manufacture of piston rings upon reading the following specification and the accompanying drawings.

In the drawings:

FIG. 4 is a plan view of a blank for another modified embodiment of this invention;

FIG. 5 is a fragmentary, oblique view of a ring body formed from the blank illustrated in FIG. 4 ready to receive the rail;

FIG. 6 is a fragmentary, sectional, elevational view taken along the plane VI—VI of FIG. 5 showing a ring fabricated from the blank illustrated in FIG. 4 installed in a ring groove;

FIG. 7 is a sectional elevation view taken along the plane VII—VII of FIG. 5;

FIG. 8 illustrates the tilting action resulting from use of a rail of slightly larger diameter than the segmented portion of the ring;

FIG. 9 illustrates the tilting action resulting from use of a rail of slightly smaller diameter than the segmented portion of the ring.

In executing the objects and purposes of this invention, there has been provided a ring assembly having a rail and a spacer-expander body. The spacer-expander body supports the rail and along its lower outer radial edge is equipped with a plurality of separate segments designed to seat against the cylinder wall and effect a sealing and scraping contact therewith. The body of the spacer-expander provides radial tension both for the rail and for the segments.

The lower side of the ring is joined to the upper side by axially extending legs which form the inner radial bight of the ring. In one form, the radial outer ends of the rail seats are curved downwardly as a rail assembly guide. In the other form, these ends are taken down to or almost to the segments of the lower side to create a box-like structure, creating a ring of substantially greater axial rigidity.

Figure 1:
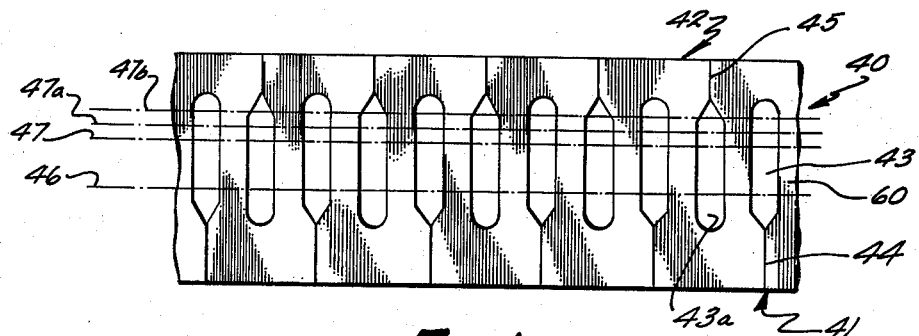
FIG. 1 is a plan view of a blank for a ring incorporating this invention.

Referring to FIG. 1, the numeral 40 refers to a blank 40 having a pair of straight, parallel edges 41 and 42. The blank is characterized by a plurality of parallel, laterally elongated apertures 43 and 43a arranged in spaced relationship alternately along the blank. The apertures may be offset from the center line of the blank toward the edge 42. The apertures 43 and 43a are identical in shape and size, each having one rounded end and one wedge-shaped or pointed end. The apertures 43a have their rounded ends adjacent the edge 41 while the apertures 43 have their rounded ends adjacent the edge 42.

Extending outwardly from the apex of the wedge-shaped end of each of the apertures 43 and 43a are score lines. The score lines 44 extending from the apertures 43 extend toward the edge 41 while the score lines 45 projecting from the ends of the apertures 43a extend toward the edge 42. The score lines 44 and 45 penetrate the surface of the blank but do not pass through the blank or form a parting in the blank prior to the blank's being shaped into the finished ring. Thus, the blank adjacent the edges 41 and 42 is a continuous ribbon of metal. The purpose of this will appear more fully hereinafter. The edges 41 and 42 of the blank are continuous, straight lines.

Figure 2:
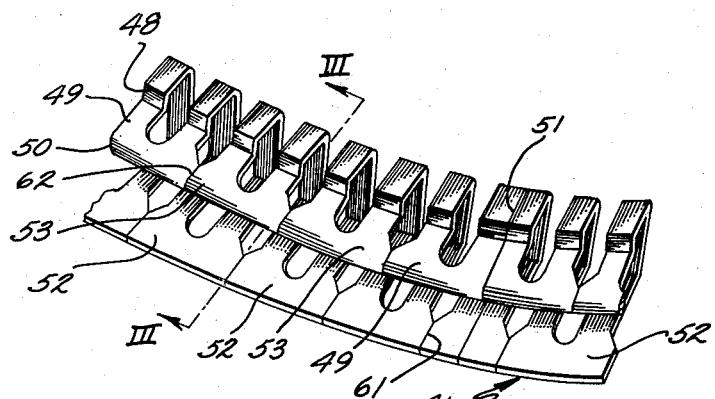
FIG. 2 is a fragmentary, oblique view of the ring body ready to receive the rail.

To form the ring illustrated in FIG. 2, the blank 40 is bent along the two parallel bend lines 46 and 47 extending lengthwise of the blank. This gives the ring its basic U-shaped cross-sectional configuration. Along the bend lines 47a and 47b the blank is offset downwardly to form a shoulder or rail stop 48 and a plurality of rail seats 49. The outer edge of the blank immediately adjacent the edge 42 is formed into a downwardly turned curve or lip 50.

After the blank has been formed to the cross-sectional configuration of the ring, it is heat treated and, while hot, coiled into a helical.

The coiling is done in such a manner that the legs 60 are on the inner diameter of the ring with the bent over portions of the blank extending radially outwardly. In the coiling, the edge 41 of the blank is formed into a continuous circle so that each segment of the edge 41 defined between a pair of the score lines 44 is arcuate and forms a part of a true circle. Following coiling it is cooled to permit it to reach a brittle hardness. It is then processed to crack or break it along the score lines 44 and 45. This forms a part or line of separation 61 at each score line extending through the outer radial portion of the lower side or land of the ring, dividing this outer or land portion into a plurality of individual segments. It also forms a plurality of parts or lines of separation 62 dividing the rail seat portion into a plurality of independently movable segments. The coil is then heat treated and drawn or stretched to open slightly the separations created by breaking the ring along the score lines. The stretching operation provides tension in the finished ring. If this were not done the ring would lock up at the joints and have infinite tension thus would be ineffective.

The coil is then heat treated to the desired hardness and resiliency. The ring thus formed is butted at a suitable point such as at 51 (FIG. 2).

The particular process of heat treating the formed blank and cracking it along the score lines does not form a part of this invention. It is taught in United States Patent No. 2,668,131 entitled Method of Making Piston Rings, issued February 2, 1954.

The breaking of the score lines 44 forms a plurality of land segments 52 collectively extending entirely around the ring at its lower outside corner. These segments initially abut each other since the forming of the separations or parts 61 at each of the score lines 44 is accomplished after the ring has been completely formed to the shape it assumes when in use. However, the segments are slightly separated by the subsequent stretching or drawing of the blank.

The breaking or cracking of the score lines 45 also creates a plurality of partings or separations 62 which define the segments 53 forming the outer ends of the individual rail seats. The partings 62, like the partings 61, are slightly widened in the stretching operation. These partings separate and define the individual rail seats.

In the completed ring body the segments 53 connect the sides or legs defining an aperture 43 while the segments 52 connect the sides or legs defining an aperture 43a. Thus, each leg at one end is connected to an adjacent leg spaced from it in one direction and at the other end is connected to an adjacent leg spaced from it in the opposite direction. These connections are on alternate sides of the ring. This affords the ring body a high degree of flexibility.

To complete the finished ring 54, a parted steel segment or rail 55 is mounted on the rail seats 49. Its assembly to the rail seats is facilitated by the guiding effect of the curved lip 50. The inner radial edge of the rail 55 bears against the rail stops or shoulders 48 while its outer radial edge bears against the cylinder wall 56. The upper surface of the rail 55 bears against the upper side 57 of the ring groove 58.

The segments 52 seat against and make scraping and sealing contact with the cylinder wall 56. They also seat down against the lower face 59 of the ring groove 58. The inner radial or bight portion of the ring is formed by that portion of the legs 60 separating the apertures 43 and 43a which are between the bend lines 46 and 47 in FIG. 4. The legs 60 provide the axial support which holds the rail seats 49 in spaced, axial relationship to the segment 52.

The legs 60 are the only connection between the upper and lower segments 53 and 52, since each segment joins only two legs. However, each leg on its opposite end is integral with a different and separate segment. Thus, the ring body is characterized by a high degree of flexibility and is capable of developing a substantially radial pressure. At the same time each rail seat 49 and each lower land segment 52 has a high degree of independence of movement. This permits the lower land segment to flex independently in response to slight variations in the cylinder wall to maintain positive scraping contact.

Figure 3:
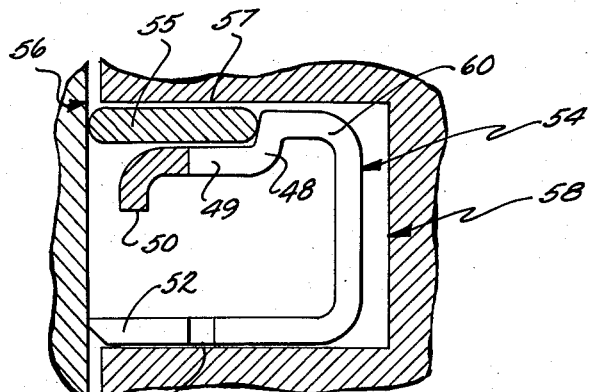
FIG. 3 is a fragmentary, sectional, elevational view of a ring incorporating this invention taken along the plane III—III of FIG. 2 installed in a ring groove.

FIGS. 4–7 illustrate a modification of this invention which is an extension of the construction illustrated in FIGS. 1, 2 and 3. In this construction the blank 100 is again a long ribbon of material consisting of a plurality of laterally extending fingers 101 spaced by slots 102 extending a major portion of the distance across the blank. The slots 102 all open through the edge 103 of the blank and terminate short of the edge 104.

Each finger 101 has a short slot 105 extending inwardly from the edge 103. The slots 105 are centered between the slots 102. Each finger also has an aperture 106 aligned with the slot 105 crosswise of the blank. This aperture is offset from the blank centerline toward the edge 104 and has a wedge-shaped end toward this edge. A score line 107 extends from the wedge-shaped end toward the edge 104. The score lines 107, as in the case of the blanks previously described, do not penetrate entirely through the blank. Thus, the blank adjacent the edge 104 is a continous ribbon of material and provides the structural continuity of the blank.

To form the blank 100 into the ring body 110, the blank is bent lengthwise along the parallel bend lines A through E. This forms a structure of general box or tubular shape in cross section with one outwardly projecting lip formed by the edge 104. The free ends of the fingers 101 extend vertically toward the portion of the blank adjacent the edge 104 to form the pressure legs 111. As illustrated in FIGS. 6 and 7, a slight gap 112 remains between these ends and the adjacent land surface. Adjacent the pressure legs 111, the fingers form rail seats 113 which are offset from the rail stops 114. The fingers also form the legs 115 which serve as the bight portion of the ring.

After the blank has been formed into the cross-sectional box-like shape of the ring, it is heat treated and coiled into a helical. The score lines 107 are then cracked or ruptured to form the partings or separations 116. Each pair of separations 116 define a separate land segment 117. The segments 117, collectively, form the lower outer diameter of the ring. Again, it is important that the score lines 107 are not fractured until after the blank has been coiled. This leaves a continuous band of metal along the lower outer diameter of the blank during coiling, assuring a smoothly curved edge curved on a continuous radius.

After the score lines 107 have been ruptured, the blank is again heat treated, stretched to slightly open the separations 116 and cut to ring length. The ends of the ring abut at the parting line 118 (FIG. 5).

To complete the assembly of the ring 110, a parted steel segment or rail 119 is mounted on the rail seats 113. Its inner face bears against the rail stops 114 while its outer radial face bears against the cylinder wall 120. The rail seats 113 hold the rail 119 in sealing contact with the upper side 121 of the ring groove 122. The land segments 117 seat against the lower surface 123 of the ring groove and form a seal therewith. The outer radial face of the segments makes sealing contact with the cylinder wall 120. Each land segment 117 forms a bridge interconnecting the radial outer end of one of the fingers 101 with an adjacent finger.

This particular construction has the same functional advantages as the ring illustrated in FIGS. 1–3. In addition, the pressure legs 111 positively limit axial compression of the ring under extreme operating conditions. The pressure legs 111 also prevent the rail from being assembled to the ring in any position than on the rail seats 113.

A more important advantage of the construction illustrated in FIGS. 4–7 is the support afforded the land segments 117. When this type of ring is installed with the land segments as the first part of the ring to enter the cylinder base, damage to the land segments is experienced all to frequently. This damage occurs when the land segments are bent upwardly by catching on the edge of the bore as the piston is pushed into the bore. When the land segments are bent excessively, they do not return to their initial position creating excessive gaps between these segments and adjacent ones. Also, they do not seat properly against the cylinder walls. The result is a poor oil seal and unsatisfactory oil economy.

The presence of the pressure legs 111 eliminates this difficulty. Once the gap 112 is closed, the pressure legs provide positive support for the land segments closely adjacent their outer radial edge. This prevents excessive bending, assuring the installation of a structurally sound and functionally satisfactory ring. Since the gap 112 is designed to be from 0.001 to 0.005 of an inch wide, the degree of bending occurring before contact occurs between the land segments and the pressure legs is negligible. Since the upper ends of the pressure legs 111 bear directly against the lower side of the rail 119 which in turn is supported by the upper side 121 of the ring groove 122, the land segments are afforded positive support. At the same time the gap 112 permits limited flexing of the lands during operation. This is necessary to give the desired cushioning effect to the ring rather than a rigid structure which will not effect the desired degree of sealing.

FIGS. 8 and 9 illustrate another feature of rings incorporating this invention. Although the ring structure shown is that of the form illustrated in FIGS. 4–7, the following observations are equally applicable to the rings illustrated in FIGS. 1–3.

In many cases it is desirable to effect positive side sealing contact with the ring groove. If a rail segment 150 (FIG. 8) is selected which has an outer diameter slightly greater than the outer diameter of the land segments 151 of the ring 152, the ring will be caused to twist slightly upwardly about its lower inside corner. The rail will also be similarly inclined. This will cause an upper seal 153 to be formed between the upper side of the rail 150 and the upper side 154 of the ring groove 155 adjacent its outer radial edge. A second seal 156 will be formed between the lower inner corner of the ring and the lower side 157 of the ring groove. This latter seal 156, however, will only be effective in the case of those ring designs having a continuous metal body at this point. The rail segment rests on the ring at or adjacent the outer radial edge of the rail seats.

If a rail segment 150a (FIG. 9) is selected which has an outer diameter slightly smaller than the outer diameter of the land segments 151 of the ring 152, the ring will be caused to twist slightly about the outer radial edge of the ring groove 155. The rail 150a will also be similarly inclined. This will cause an upper seal 158 to be formed between the upper side 154 of the ring groove and the upper side of the ring adjacent its inner edge. A second seal 159 is formed between the lower face of the land segments 151 and the radial outer edge of the lower side 157 of the ring groove 155. Again, the rail segment 150a will rest on the rail seats at or adjacent their outer radial edge.

These seals serve as further assurance against oil and gases by-passing the ring by traveling around the ring through the ring groove. The direction in which the ring is twisted would be determined by the primary purpose for which the ring is used. If the ring is used as an oil ring it will in all likelihood be twisted as illustrated in FIG. 9. If it is used in the middle ring groove, it may be twisted as illustrated in FIG. 8.

This invention provides a superior oil ring. It combines the sealing effect of a steel segment or rail having but a single parting with the flexibility and conformability of a segmented scraping land. Since the rail forms a seal with only a single parting, the fact that a number of partings exist in the segmented scraping land portion of the ring does not adversely effect the function of the ring. At the same time, the ring has the benefit of the clean scraping effect of the segmented scraping lands which are able to flex readily and closely fit against the cylinder wall to scrape excessive lubricant from these walls and thus confine it to the crankcase.

Each of the constructions illustrated assures application of positive radial tension upon each land segment. Further, each segment has a high degree of independence of movement. Thus, the scraping edge formed by the land segments is highly flexible and capable of maintaining an effective scraping action at all times. The length of the legs supporting the land segments is important in producing this effect.

The construction of the ring permits the ring to be formed into its circular shape before formation of the partings or separations which define the segments of the lower land. Thus, the partings are formed when the ring has attained its final shape and the partings, when the ring is installed in the cylinder, have so small an opening that the passage of lubricant through the partings is reduced to an absolute minimum. This is important in forming a ring having a highly efficient oil seal. Further, this process permits each of the segments to be a portion of a continuous curve. In this manner, the entire outer radial surface of each land seats against and makes full contact with the cylinder wall to form a firm and positive scraping engagement.

This invention provides a ring with sufficient radial tension to effect proper sealing engagement with the cylinder wall by both the rail and the land scraping segments. This is important to keep the oil confined to the crankcase. At the same time the construction of the ring permits it to effect proper sealing engagement between the rail and the upper side of the ring groove and the land segments and the lower side of the ring groove. This is also important in preventing leakage past the ring between the ring and the sides of the ring groove. The ring allows the amount of side pressure effected against the land segments and the rail to be accurately controlled so that the pressure is sufficient to form the seal without at the same time causing a bind between either the rail or the segments and the sides of the ring groove. The presence of the pressure legs 111 positively spaces the rail 119 and the land segments 117 axially and maintains this spacing during the ring's operation. Thus, this spacing having been properly determined initially, will remain constant after the ring has been placed in operation. This also assures sufficient freedom of the rail and the segments to effect conformity to the cylinder walls.

The design of this ring permits the radial depth of the ring to be independent of the radial depth of the steel segment or rail. Rails having a wide variety of radial depths may be utilized with this ring without impairing the radial tenson of the ring and without increasing or decreasing the over-all radial depth of the ring such that it will interfere with the ring's proper installation. At the same time the construction of the ring provides a spring structure co-operating with the individual land scraping segments in such a way that the degree of the unit pressure applied to the land segments has a high degree of uniformity throughout the circumference of the ring.

The construction of this invention is particularly adapted to a thin ring. This construction permits the width of the ring to be reduced at least to 0.125 of an inch. This is important in reducing piston length and thus both the over-all size and weight of the engine. This reduction in width is accomplished without loss of efficiency. Since the construction utilizes only the relatively thin material of the ring body for the lower land plus one additional thickness of this material and the thickness of a single rail, the construction lends itself to reduced width without loss of resiliency either radially or axially. It also permits the metal of the ring body to be bent on radii which are well within the acceptable limits of the material. No other ring construction has accomplished this result.

It will be seen that this invention provides a ring combining a number of advantageous characteristics which have never heretofore been combined in a single ring. While a preferred embodiment and a modification of this embodiment have been illustrated and described, it will be recognized that other modifications of this invention may be made. It should also be understood that while the several rings have been described with the rail on top and the land segments on the bottom, this invention is not limited to this particular arrangement. It is within the scope of this invention to invert this structure, placing the rail on the bottom and the land segments on the top. This and such other modifications as incorporate the principles of this invention are to be considered as covered by the hereinafter appended claims unless these claims by their language expressly state otherwise.

I claim:

1. A piston ring comprising: a radially extending flat circular land portion forming one side and an outer radial edge of said ring; said land portion being subdivided into a plurality of short segments; a plurality of circumferentially spaced fingers; said fingers being arranged in pairs, one leg of each pair being integral with a different land segment; said legs at the ends remote from said land segments being integrally joined and forming the only connection between adjacent land segments; portions of said fingers forming the axially extending radially inner bight portion of said ring and other portions forming the other side of said ring; a portion of said other side being offset toward said land segments and forming a rail seat; said fingers at said offset extending generally axially and forming stops for engaging the inner radial edge of a rail segment, said stops being radially spaced from said inner bight portion of said ring; the ends of said fingers radially outwardly of said rail seat extending parallel to said bight portion and substantially closing the outer radial face of said ring.

2. A piston ring as recited in claim 1 wherein a parted rail segment is provided; said rail segment being seated on said rail seat and against said rail stops.

3. A piston ring comprising: a body element having a plurality of land segments forming one outer radial edge and adapted to engage a cylinder wall; each of said land segments being movable independently of each adjacent land segment; a leg member integral with each of said land segments; means connecting said leg member of one land segment to the leg member of each adjacent land segments, said connecting means being at the other end of said legs and remote from said land segments; said leg members intermediate their ends being offset upwardly from said rail seats along the radial inner edge of said ring, said offset forming a plurality of rail stops for engaging the inner radial edge of a rail member, said rail stops being radially spaced from said connecting means; said legs outwardly of said rail seats extending axially of said ring to substantially close the outer radial face of said ring.

4. A piston ring comprising: a body element having a plurality of land segments forming one outer radial edge and adapted to engage a cylinder wall; each of said land segments being movable independently of each adjacent land segment; a leg member integral with each of said land segments; means connecting said leg member of one land segment to the leg member of each adjacent land segment, said connecting means being spaced from said land segments; said leg members intermediate their ends being offset upwardly from said rail seats along the radial inner edge of said ring, said offset forming a plurality of rail stops for engaging the inner radial edge of a rail member, said rail stops being radially spaced from said connecting means; said legs outwardly of said rail seats extending axially of said ring with their ends adjacent said land segments.

5. A piston ring as described in claim 4 wherein a parted rail member is provided; said rail member being seated on said rail seats and against said rail stops.

References Cited by the Examiner
UNITED STATES PATENTS

| | | | |
|---|---|---|---|
| 2,596,286 | 5/52 | Phillips | 277—140 |
| 2,635,022 | 4/53 | Shirk | 277—140 |
| 2,768,038 | 10/56 | Cable | 277—140 |

EDWARD V. BENHAM, Primary Examiner.

SAMUEL ROTHBERG, Examiner.